Apr. 3, 1923.  
O. H. DOERFLER  
SERVING APPARATUS  
Filed Dec. 5, 1922
1,450,434
2 sheets-sheet 1
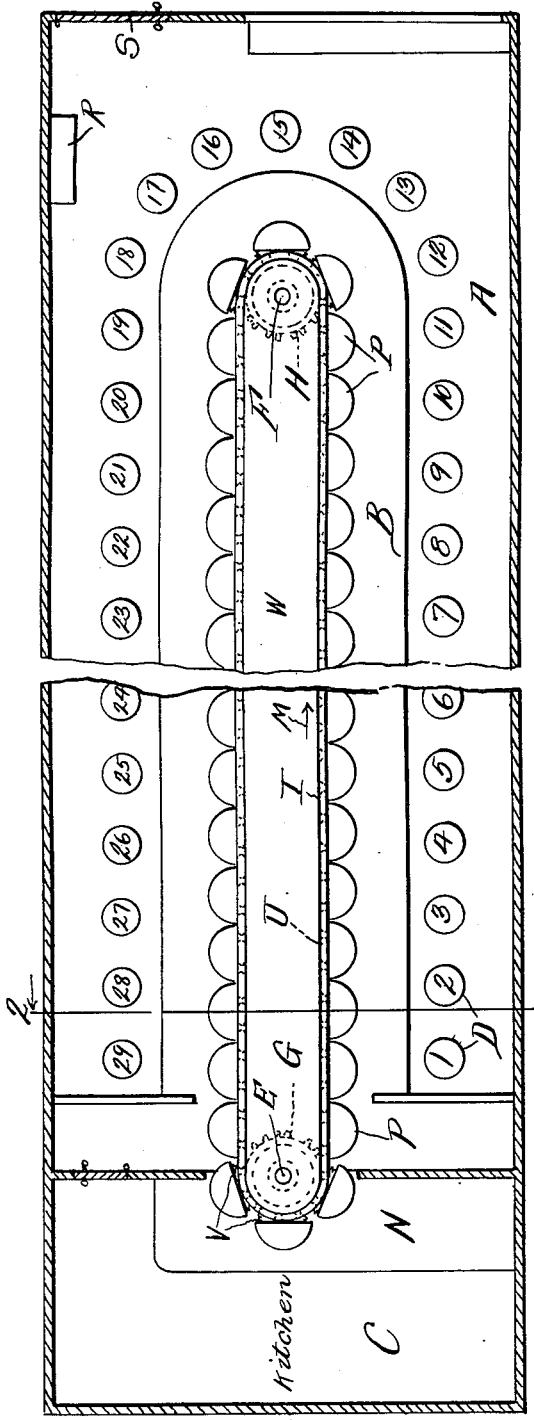
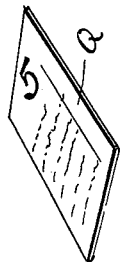
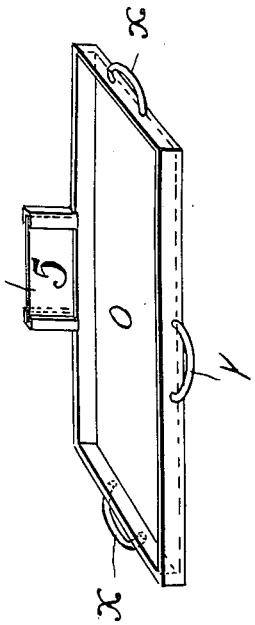
Inventor  
O. H. Doerfler  
By Philip A. H. Ferrell  
Attorney Apr. 3, 1923.

O. H. DOERFLER

SERVING APPARATUS

Filed Dec. 5, 1922

Inventor
O. H. Doerfler
By Philip A. Ferrell
Attorney

Patented Apr. 3, 1923.

1,450,434

UNITED STATES PATENT OFFICE.

OTTO H. DOERFLER, OF OMAHA, NEBRASKA.

SERVING APPARATUS.

Application filed December 5, 1922. Serial No. 604,988.

*To all whom it may concern:*

Be it known that I, OTTO H. DOERFLER, citizen of the United States, residing at Omaha, in the county of Douglas and State of Nebraska, have invented certain new and useful Improvements in Serving Apparatus, of which the following is a specification, reference being had therein to the accompanying drawings.

The invention relates to serving apparatus, and has for its object to provide a device of this character comprising an elongated counter or table, and an endless conveyor having horizontally disposed tray receiving shelves on which trays of food may be deposited, and conveyed to positions adjacent numbered seats. Also to provide each tray with a number so that the occupant of a particular seat will know when his tray arrives adjacent his position, having previously ordered by placing a slip on the conveyor, which slip is conveyed to the kitchen.

A further object is to mount the shelves on the conveyor endless chain by securing the shelves centrally to the chain and providing springs interposed between the ends of the shelves and adjacent links, said springs forming means for holding and balancing the shelves as they pass around the drive sprockets.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawings:—

Figure 1 is a top plan view of the serving apparatus.

Figure 4 is a perspective view of one of the serving trays.

Figure 5 is a perspective view of one of the order checks.

Figure 2:
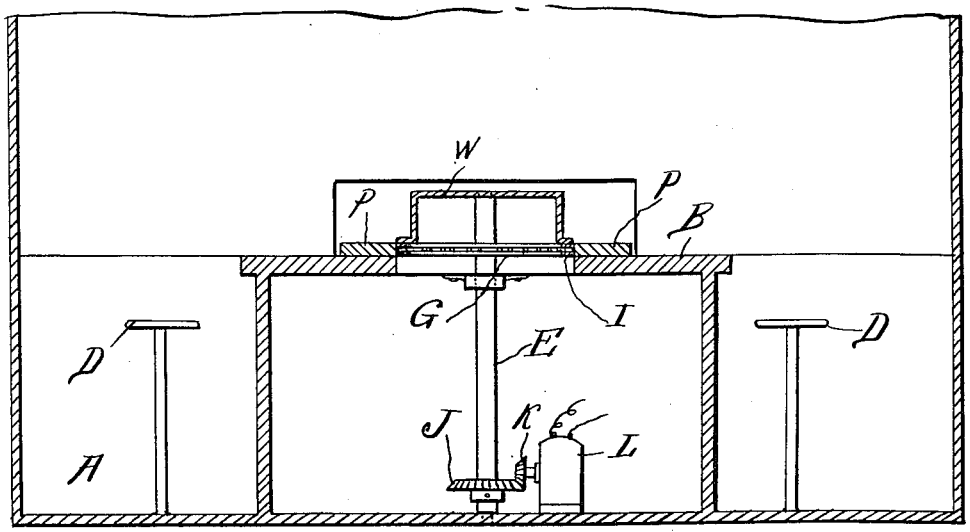
Figure 2 is a vertical transverse sectional view taken on line 2—2 of Figure 1.

Referring to the drawings, the letter A designates a lunch room, B a U-shaped counter and C the kitchen. Disposed adjacent the U-shaped counter B are a plurality of seats D consecutively numbered, and on which seats patrons sit. Extending upwardly between the opposite sides of the U-shaped counter B are shafts E and F, which are vertically disposed and provided with sprockets G and H. The sprocket G is a drive sprocket and drives the endless sprocket chain I. Shaft E adjacent its lower end is provided with a gear J, which is driven by the gear K of the motor L continuously so that the sprocket chain I will move in the direction of an arrow M. The sprocket chain I extends into the kitchen C over the table N in the kitchen where orders are filled, placed in trays O, which trays are placed on the horizontally disposed shelves P, carried by the sprocket chain I. A customer comes into the lunch room A, takes one of the seats, for instance seat 5, picks up a conventional form of menu card and then writes his order on the order blank Q as shown in Figure 5, which order blank is provided with a number 5 corresponding to the number on the seat. After the order has been made out it is placed on one of the shelves P and is conveyed to the kitchen where the order is filled and placed in a tray O with the number 5, thereon, which tray is then placed on one of the shelves P and conveyed to a position within easy reach of the occupant of the seat number 5. After the tray has reached the position adjacent the seat 5, the occupant of the seat removes the tray from the shelf with the charge slip thereon and after the meal pays the cashier at the desk R adjacent the door S leading from the lunch room. It will be seen that the use of waiters is eliminated and the serving of the meal accomplished with the minimum amount of labor.

Figure 3:
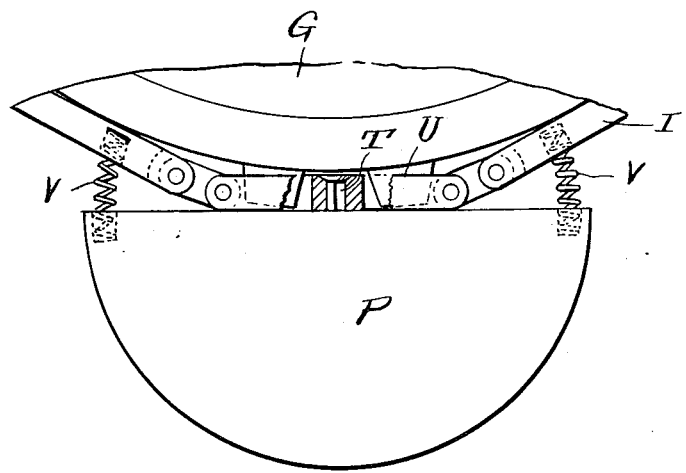
Figure 3 is an enlarged top plan view of a portion of one of the sprockets and one of the shelves carried by a portion of the sprocket chain, parts being broken away to better show the structure.

The shelves P slide over the counter and are braced thereby in their movement. The shelves P are each secured to one of the links of the chain by means of the lugs T, which lugs are centrally located in relation to the shelves, and to one of the links U of the chain. However to brace the shelves P as they are passing over the sprockets G and H, coiled springs V are interposed between the ends of the shelves and adjacent links U as shown in Figure 3, which coiled springs exert an expansible action and consequently steady and brace the shelves by the horizontal thrust of the springs. The endless sprocket chain I and the sprockets G and H are housed by casings W, which not only lend an artistic appearance to the device by concealing the mechanical and working parts thereof, but prevent articles from becoming caught in the working parts or injury to patrons. The trays O are provided with end handles X, and with a handle Y which are adapted to be grasped for handling the tray, for instance when placing the tray on one of the shelves or when removing the same therefrom. Each tray is provided with a removable number Z which is placed thereon by the person filling the order in the kitchen.

From the above it will be seen that a serving apparatus is provided for lunch rooms which is simple in construction positive in operation and one wherein waiters are eliminated, thereby reducing the cost of operation of the lunch room to a minimum.

The invention having been set forth what is claimed as new and useful is:—

The combination with a U-shaped counter, an endless sprocket chain conveyor horizontally disposed and between the opposite sides of the counter, shelves horizontally disposed and carried by the sprocket chain, said shelves being centrally secured to one of the links of the sprocket chain centrally thereof and springs interposed between the outer ends of the shelves and the adjacent links of the sprocket chain, and forming means for guiding and bracing the shelves as they pass over the sprockets.

In testimony whereof I hereunto affix my signature.

OTTO H. DOERFLER.